United States Patent
Seto et al.

(10) Patent No.: US 9,368,771 B2
(45) Date of Patent: Jun. 14, 2016

(54) ELECTRIC STORAGE MODULE AND ELECTRIC STORAGE DEVICE

(75) Inventors: Sadashi Seto, Hitachinaka (JP); Tatsuo Sugawara, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 768 days.

(21) Appl. No.: 13/075,533

(22) Filed: Mar. 30, 2011

(65) Prior Publication Data

US 2011/0244282 A1 Oct. 6, 2011

(30) Foreign Application Priority Data

Apr. 1, 2010 (JP) ................................. 2010-085114

(51) Int. Cl.
*H01M 2/12* (2006.01)
*H01M 2/10* (2006.01)
*H01M 10/6553* (2014.01)

(52) U.S. Cl.
CPC .............. *H01M 2/1077* (2013.01); *H01M 2/12* (2013.01); *H01M 10/6553* (2015.04)

(58) Field of Classification Search
USPC .......................................... 429/158, 123, 160
See application file for complete search history.

(56) References Cited

U.S. PATENT DOCUMENTS

| | | | | |
|---|---|---|---|---|
| 4,374,187 A | * | 2/1983 | Sano ............................. | 429/175 |
| 6,174,618 B1 | * | 1/2001 | Nishiyama et al. ............. | 429/99 |
| 6,479,187 B1 | | 11/2002 | Takasaki et al. | |
| 2001/0046624 A1 | * | 11/2001 | Goto et al. ....................... | 429/99 |
| 2008/0057393 A1 | * | 3/2008 | Onuki et al. ................... | 429/159 |
| 2009/0181288 A1 | | 7/2009 | Sato | |
| 2009/0202897 A1 | * | 8/2009 | Kim et al. ...................... | 429/120 |
| 2010/0116570 A1 | | 5/2010 | Sugawara et al. | |
| 2011/0244283 A1 | | 10/2011 | Seto et al. | |

FOREIGN PATENT DOCUMENTS

| | | |
|---|---|---|
| JP | 6-223804 | 8/1994 |
| JP | 9-7564 | 1/1997 |
| JP | 2000-182583 A | 6/2000 |
| JP | 2000-223097 A | 8/2000 |
| JP | 2000-223160 A | 8/2000 |

(Continued)

OTHER PUBLICATIONS

Explanation of Circumstances Concerning Accelerated Examination submitted to the Japanese Patent Office on Dec. 28, 2012, including English-language translation. (Nine (9) pages).

(Continued)

*Primary Examiner* — Alix Eggerding
(74) *Attorney, Agent, or Firm* — Crowell & Moring LLP

(57) ABSTRACT

An electric storage module includes: a plurality of electric storage units; a casing that houses the plurality of electric storage units, and includes a pair of resin side plates that hold and support at least the plurality of electric storage units from opposite sides; a plurality of conductive members for electrically connecting the plurality of electric storage units; a metal cover member that covers the casing on an outside of each of the side plates; and a peripheral wall protruding from each of the side plates so as to surround each of the plurality of conductive members, wherein: a height of the peripheral wall from each of the side plates is higher than a height of the conductive members from each of the side plates, and smaller than a distance from each of the side plates to the cover member.

5 Claims, 11 Drawing Sheets

(56) References Cited

FOREIGN PATENT DOCUMENTS

| | | | |
|---|---|---|---|
| JP | 2000-340195 | A | 12/2000 |
| JP | 2001-155702 | A | 6/2001 |
| JP | 2006-324348 | A | 11/2006 |
| JP | 2007-200712 | A | 8/2007 |
| JP | 2008-243412 | A | 10/2008 |
| JP | 2009-164085 | | 7/2009 |
| JP | 2009-301982 | | 12/2009 |
| JP | 2010-113999 | A | 5/2010 |
| JP | 2011-216401 | A | 10/2011 |

OTHER PUBLICATIONS

Japanese Office Action with English translation dated Jan. 15, 2013 (five (5) pages).

Japanese Office Action dated Apr. 1, 2014, with English Translation (eight (8) pages).

* cited by examiner

ELECTRIC STORAGE MODULE AND ELECTRIC STORAGE DEVICE

INCORPORATION BY REFERENCE

The disclosure of the following priority application is herein incorporated by reference: Japanese Patent Application No. 2010-085114 filed Apr. 1, 2010.

BACKGROUND OF THE INVENTION

1. Field of the Invention

The present invention relates to an electric storage module including a plurality of electric storage units and an electric storage device.

2. Description of Related Art

Japanese Laid-Open Patent Publication No. 2000-223160 discloses a power supply device in which a plurality of battery modules including a plurality of batteries connected in series are housed in a battery case, and a protective electronic circuit mounted to the battery case protects the batteries in the battery modules. In the power supply device described in Japanese Laid-Open Patent Publication No. 2000-223160, bus bars that connect the plurality of battery modules and the protective electronic circuit are connected via fuses by voltage detection bus bars in order to detect a voltage of each battery module. The bus bars are included in a side plate.

SUMMARY OF THE INVENTION

In the device disclosed in Japanese Laid-Open Patent Publication No. 2000-223160, the number of bus bars increases with increasing number of batteries in the battery device. When the power supply device is protected by, for example, a conductive cover member of metal or the like, and the cover member is deformed by an external force and brought into contact with the bus bars, a short circuit occurs between the cover member and the bus bars.

An electric storage module according to a first aspect of the present invention comprises: a plurality of electric storage units; a casing that houses the plurality of electric storage units, and includes a pair of resin side plates that hold and support at least the plurality of electric storage units from opposite sides; a plurality of conductive members for electrically connecting the plurality of electric storage units; a metal cover member that covers the casing on an outside of each of the side plates; and a peripheral wall protruding from each of the side plates so as to surround each of the plurality of conductive members, wherein: a height of the peripheral wall from each of the side plates is higher than a height of the conductive members from each of the side plates, and smaller than a distance from each of the side plates to the cover member.

An electric storage module according to a second aspect of the present invention comprises: a plurality of electric storage units; a casing that houses the plurality of electric storage units, and includes a pair of resin side plates that hold and support at least the plurality of electric storage units from opposite sides; and a plurality of conductive members for electrically connecting the plurality of electric storage units; wherein: the plurality of electric storage units and the plurality of conductive members are fusion-joined; and the plurality of conductive members have a wall for heat dissipation in the fusion-joining.

According to a third aspect of the present invention, in the electric storage module according to the second aspect, it is preferable that end regions of the plurality of conductive members are joined to end surfaces of the plurality of electric storage units, and an oval through hole for releasing a gas from each electric storage unit is formed in each of the end regions of the plurality of conductive members.

According to a fourth aspect of the present invention, the electric storage module according to the second aspect may further comprise: a metal cover member that covers the casing on an outside of each of the pair of side plates, wherein: a height of the wall is set to be lower than a height of the cover member mounted to each of the side plates when the plurality of conductive members and the plurality of electric storage units are fusion-joined.

According to a fifth aspect of the present invention, in the electric storage module according to the second aspect, the plurality of electric storage units and the plurality of conductive members may be fusion-joined by arc welding.

According to a sixth aspect of the present invention, the electric storage module according to the first aspect may further comprise: a voltage detection conductor for detecting a voltage of each of the plurality of electric storage units, wherein: the voltage detection conductor is formed to have a plurality of detection lines corresponding to positions of the plurality of conductive members, and a distance between the plurality of detection lines is set to 2 to 2.5 times an insulation creepage distance determined by a voltage of the electric storage module.

An electric storage device according to a seventh aspect of the present invention comprises: an electric storage module according to the sixth aspect; and a control device that is connected to the voltage detection conductor to detect a voltage of the plurality of electric storage units and control an electric storage amount of the plurality of electric storage units.

DESCRIPTION OF PREFERRED EMBODIMENTS

Now, an electric storage module and an electric storage device according to an embodiment of the present invention will be described with reference to the drawings.

An example of a case will be described below where the electric storage module according to the embodiment is applied to an electric storage device that constitutes an on-vehicle power supply device of an electric vehicle, particularly, an electric automobile. The electric automobile includes a hybrid electric automobile equipped with an engine as an internal combustion engine and a motor as drive sources of the automobile, and a genuine electric automobile including a motor as an only drive source of the automobile, or the like.

Figure 1:
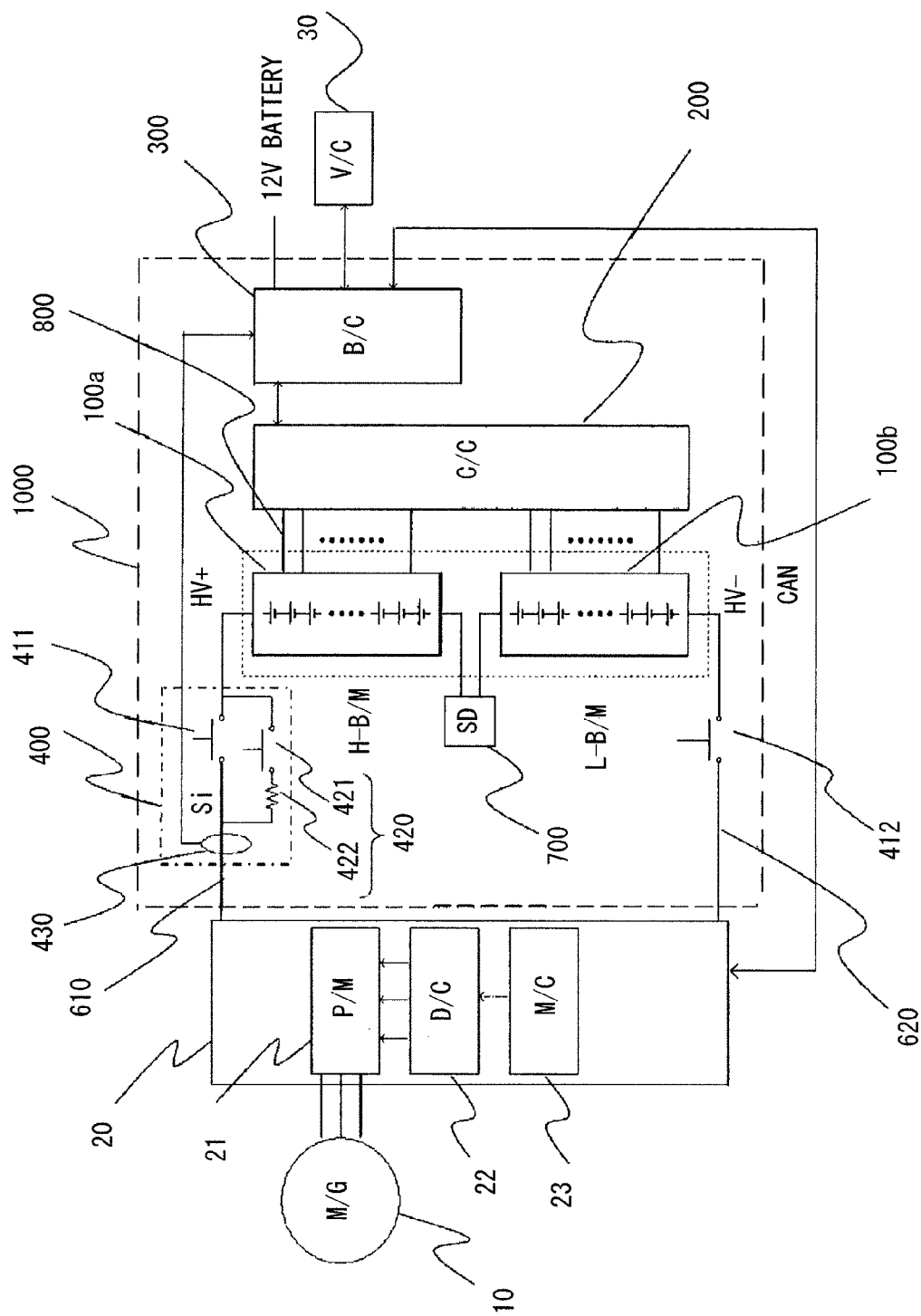
FIG. 1 is a block diagram showing a configuration of an on-vehicle electric machinery system using an electric storage device according to an embodiment of the present invention.

First, with reference to FIG. 1, a configuration of an on-vehicle electric machinery system (motor drive system) including the electric storage module according to the embodiment will be described.

The on-vehicle electric machinery system includes a motor generator 10, an inverter device 20, a vehicle controller 30 that controls the entire vehicle, an electric storage device 1000 that constitutes an on-vehicle power supply device, or the like. The electric storage device 1000 includes a plurality of electric storage units, and is configured as, for example, a lithium ion battery device including a plurality of lithium ion battery cells.

The motor generator 10 is a three-phase AC synchronous machine. The motor generator 10 performs motor driving in an operation mode that requires rotational power such as in power running of the vehicle and when an engine as an internal combustion engine is started, and supplies generated rotational power to driven members such as wheels and the engine. In this case, the on-vehicle electric machinery system converts DC power from the lithium ion battery device 1000 into three-phase AC power via the inverter device 20 as a power conversion device and supplies the three-phase AC power to the motor generator 10.

The motor generator 10 operates as a generator by a drive force from the wheels or the engine to generate three-phase AC power in an operation mode that requires power generation such as in regeneration during, for instance, deceleration or braking of the vehicle and when the lithium ion battery device 1000 needs to be charged. In this case, the on-vehicle electric machinery system converts three-phase AC power from the motor generator 10 into DC power via the inverter device 20 and supplies the DC power to the lithium ion battery device 1000. Thus, power is stored in the lithium ion battery device 1000.

The inverter device 20 is an electronic circuit device that controls the power conversion, that is, conversion from the DC power to the three-phase AC power and conversion from the three-phase AC power to the DC power in response to an operation (on/off) of a switching semiconductor device. The inverter device 20 includes a power module 21, a driver circuit 22, and a motor controller 23.

The power module 21 is a power conversion circuit that includes six switching semiconductor devices, and performs the power conversion according to switching operations (on/off) of the six switching semiconductor devices.

In the power module 21, a DC positive module terminal is electrically connected to a DC positive external terminal, and a DC negative module terminal is electrically connected to a DC negative external terminal. The DC positive external terminal and the DC negative external terminal are power supply side terminals for supplying and receiving DC power to and from the lithium ion battery device 1000, and power supply cables 610 and 620 extending from the lithium ion battery device 1000 are electrically connected to the DC positive external terminal and the DC negative external terminal. An AC module terminal is electrically connected to an AC external terminal. The AC external terminal is a load terminal for supplying and receiving three-phase AC power to and from the motor generator 10, and a load cable extending from the motor generator 10 is electrically connected to the AC external terminal.

The motor controller 23 is an electronic circuit device for controlling switching operations of the six switching semiconductor devices that constitute the power conversion circuit. The motor controller 23 generates switching operation command signals (for example, PWM (pulse width modulation) signals) for the six switching semiconductor devices based on a torque command output from a host control device, for example, the vehicle controller 30 that controls the entire vehicle. The generated command signals are output to the driver circuit 22.

The lithium ion battery device 1000 includes a battery module (electric storage module) 100 for storing and discharging electric energy, i.e., for charging and discharging DC power, and a control device 900 (see FIG. 2) for managing and controlling a state of the battery module 100.

The battery module 100 includes two battery blocks (or battery packs), that is, a high potential battery block 100a and a low potential battery block 100b electrically connected in series. Each battery block houses an assembled battery. Each assembled battery includes a plurality of lithium ion battery cells electrically connected in series. A configuration of each battery block will be described later.

An SD (service disconnect) switch 700 is provided between a negative side (low potential side) of the high potential battery block 100a and a positive side (high potential side) of the low potential battery block 100b. The SD switch 700 is a safety device provided for ensuring safety in maintenance and inspection of the lithium ion battery device 1000, includes an electrical circuit in which a switch and a fuse are electrically connected in series, and is operated by a serviceman in maintenance and inspection.

A control device 900 (see FIG. 2) includes a battery controller 300 which is a host (master) controller and a cell controller 200 which is a subordinate (slave) controller.

The battery controller 300 manages and controls the state of the lithium ion battery device 1000, and notifies a host control device, that is, the vehicle controller 30 or the motor controller 23, of the state of the lithium ion battery device 1000, charge/discharge control commands of acceptable charge/discharge power and the like. Management and control of the state of the lithium ion battery device 1000 include measurement of a voltage and a current of the lithium ion battery device 1000, calculation of an electric storage state (SOC: State of Charge) and a deterioration state (SOH: State of Health) of the lithium ion battery device 1000, measurement of temperature of each battery block, and output of commands, for example, a command for measuring a voltage of each lithium ion battery cell, and a command for adjusting an electric storage amount of each lithium ion battery cell, to the cell controller 200.

The cell controller 200 is a subordinate controller of the battery controller 300 that manages and controls states of the plurality of lithium ion battery cells according to the commands from the battery controller 300, and includes a plurality of integrated circuits (ICs). Management and control of the state of the plurality of lithium ion battery cells include measurement of a voltage of each lithium ion battery cell, and adjustment of an electric storage amount of each lithium ion battery cell. The integrated circuits correspond to the plurality of lithium ion battery cells, and manage and control states of the corresponding plurality of lithium ion battery cells.

As power sources of the integrated circuits that constitute the cell controller 200, the corresponding plurality of lithium ion battery cells are used. Thus, the cell controller 200 and the battery module 100 are electrically connected via a connection line 800. A highest potential voltage of the corresponding plurality of lithium ion battery cells is applied to each integrated circuit via the connection line 800.

A positive terminal of the high potential battery block 100a and the DC positive external terminal of the inverter device 20 are electrically connected via the positive power supply cable 610. A negative terminal of the low potential battery block 100b and the DC negative external terminal of the inverter device 20 are electrically connected via the negative power supply cable 620.

A junction box 400 and a negative main relay 412 are provided in the middle of the power supply cables 610 and 620. The junction box 400 houses a relay mechanism including a positive main relay 411 and a precharge circuit 420. The relay mechanism is an opening/closing portion for electrical conduction and break between the battery module 100 and the inverter device 20. The relay mechanism conducts between the battery module 100 and the inverter device 20 at a start of the on-vehicle electric machinery system, and breaks between the battery module 100 and the inverter device 20 at a stop and abnormality of the on-vehicle electric machinery system. The relay mechanism thus controls between the lithium ion battery device 1000 and the inverter device 20, thereby ensuring high safety of the on-vehicle electric machinery system.

Driving of the relay mechanism is controlled by the motor controller 23. The motor controller 23 receives notification of completion of a startup of the lithium ion battery device 1000 from the battery controller 300 at the start of the on-vehicle electric machinery system, and thus outputs a command signal for conduction to the relay mechanism to drive the relay mechanism. The motor controller 23 receives an OFF signal output from an ignition key switch at the stop of the on-vehicle electric machinery system, and receives an abnormality signal from the vehicle controller in abnormality of the on-vehicle electric machinery system, and thus outputs a command signal for break to the relay mechanism to drive the relay mechanism.

The main relay includes the positive main relay 411 and the negative main relay 412. The positive main relay 411 is provided in the middle of the positive power supply cable 610, and controls electrical connection between a positive side of the lithium ion battery device 1000 and a positive side of the inverter device 20. The negative main relay 412 is provided in the middle of the negative power supply cable 620, and controls electrical connection between a negative side of the lithium ion battery device 1000 and a negative side of the inverter device 20.

The precharge circuit 420 is a series circuit in which a precharge relay 421 and a resistor 422 are electrically connected in series, and electrically connected to the positive main relay 411 in parallel.

At the start of the on-vehicle electric machinery system, the negative main relay 412 is first activated, and then the precharge relay 421 is activated. Thus, a current supplied from the lithium ion battery device 1000 is controlled by the resistor 422, and is then supplied to and charges a smoothing capacitor included in the inverter. After the smoothing capacitor is charged to a predetermined voltage, the positive main relay 411 is activated, and the precharge relay 421 is released. Thus, a main current is supplied from the lithium ion battery device 1000 via the positive main relay 411 to the inverter device 20.

The junction box 400 houses a current sensor 430. The current sensor 430 is provided for detecting a current supplied from the lithium ion battery device 1000 to the inverter device 20. An output line of the current sensor 430 is electrically connected to the battery controller 300. The battery controller 300 detects the current supplied from the lithium ion battery device 1000 to the inverter device 20 based on a signal output from the current sensor 430. The current detection information is notified from the battery controller 300 to the motor controller 23 or the vehicle controller 30. The current sensor 430 may be placed outside the junction box 400. A current of the lithium ion battery device 1000 may be detected at a position toward the inverter device 20 with respect to the positive main relay 411, and also at a position toward the battery module 100 with respect to the positive main relay 411.

The junction box 400 may house a voltage sensor for detecting a voltage of the lithium ion battery device 1000. In such a case, an output line of the voltage sensor is electrically connected to the battery controller 300 like the current sensor 430. The battery controller 300 determines a voltage of the entire lithium ion battery device 1000 based on an output signal of the voltage sensor. The voltage detection information is notified to the motor controller 23 or the vehicle controller 30. A voltage of the lithium ion battery device 1000 may be detected either at a position toward the battery module 100 or toward the inverter device 20 with respect to the relay mechanism.

Figure 2:
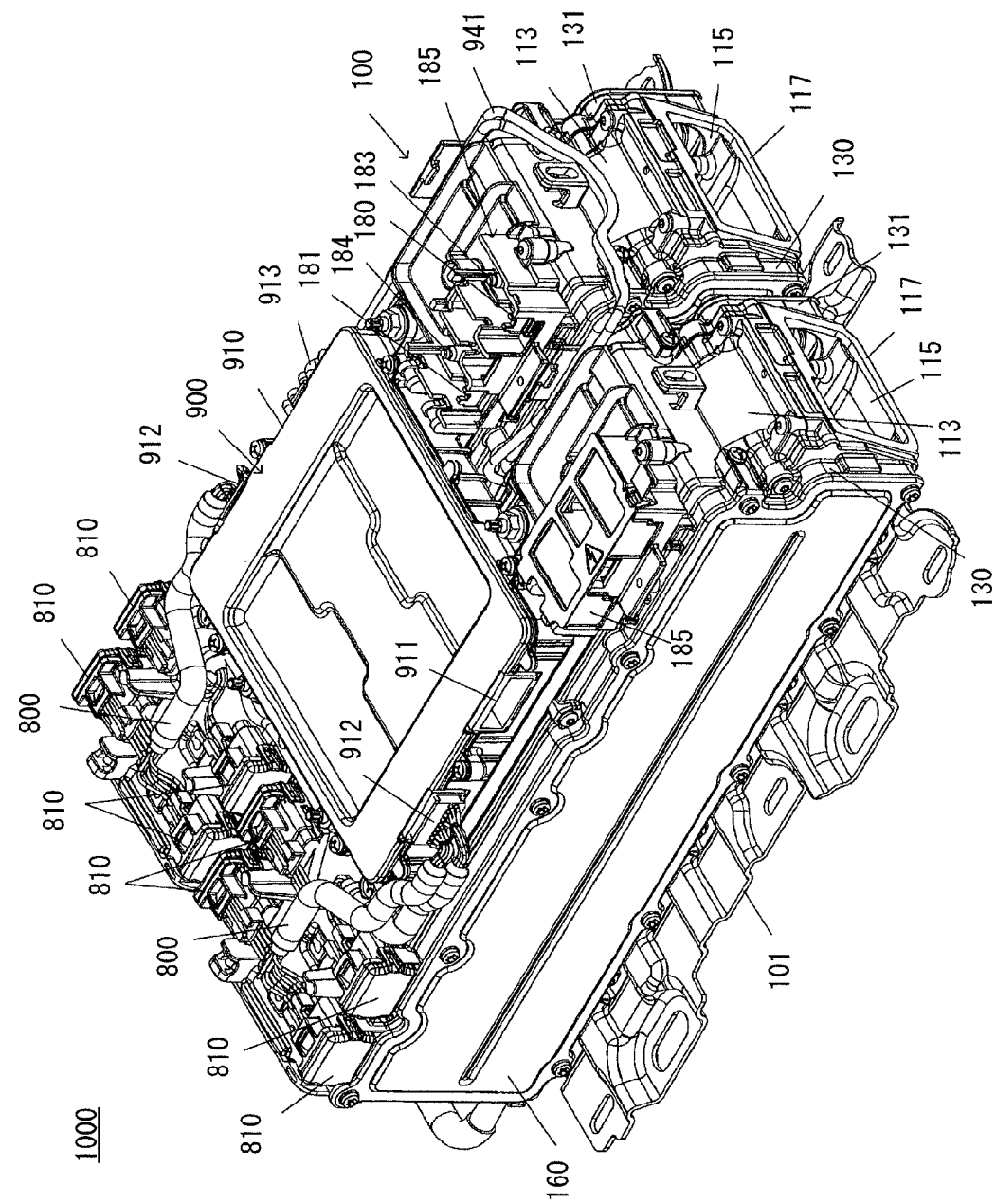
FIG. 2 is a perspective view showing an overall appearance configuration of a lithium ion battery device according to an embodiment of the present invention.
Figure 3:
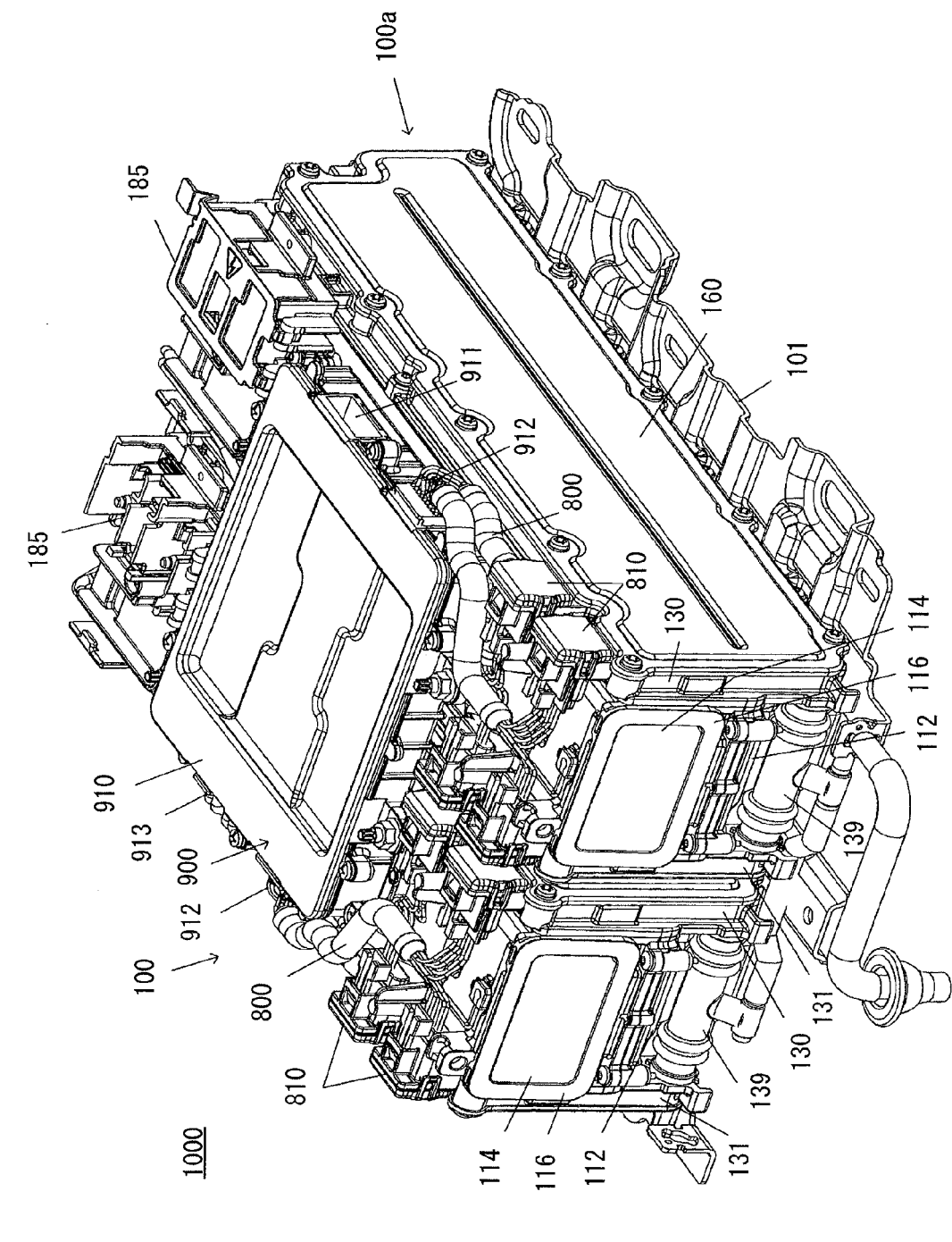
FIG. 3 is a perspective view of the lithium ion battery device in FIG. 2 viewed from a cooling medium inlet side.
Figure 4:
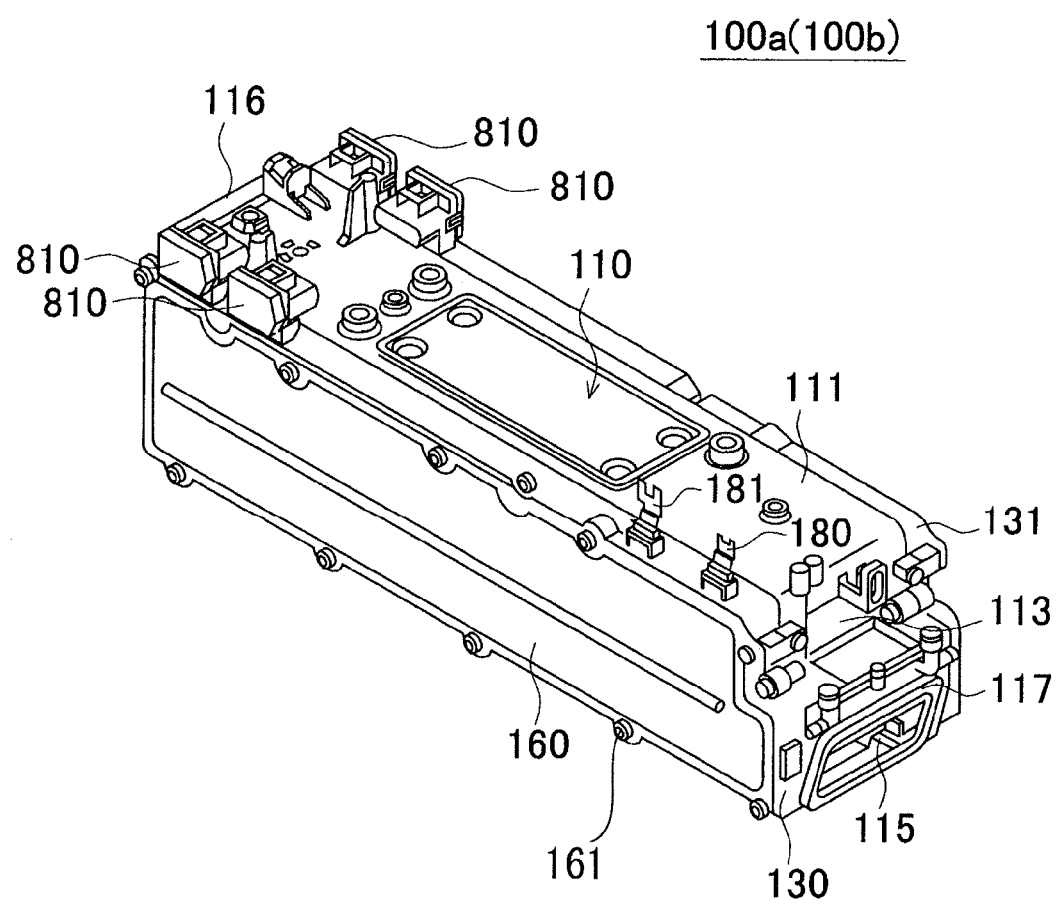
FIG. 4 is a perspective view showing an overall appearance configuration of one battery block of a battery module that constitutes the lithium ion battery device according to the embodiment.
Figure 5:
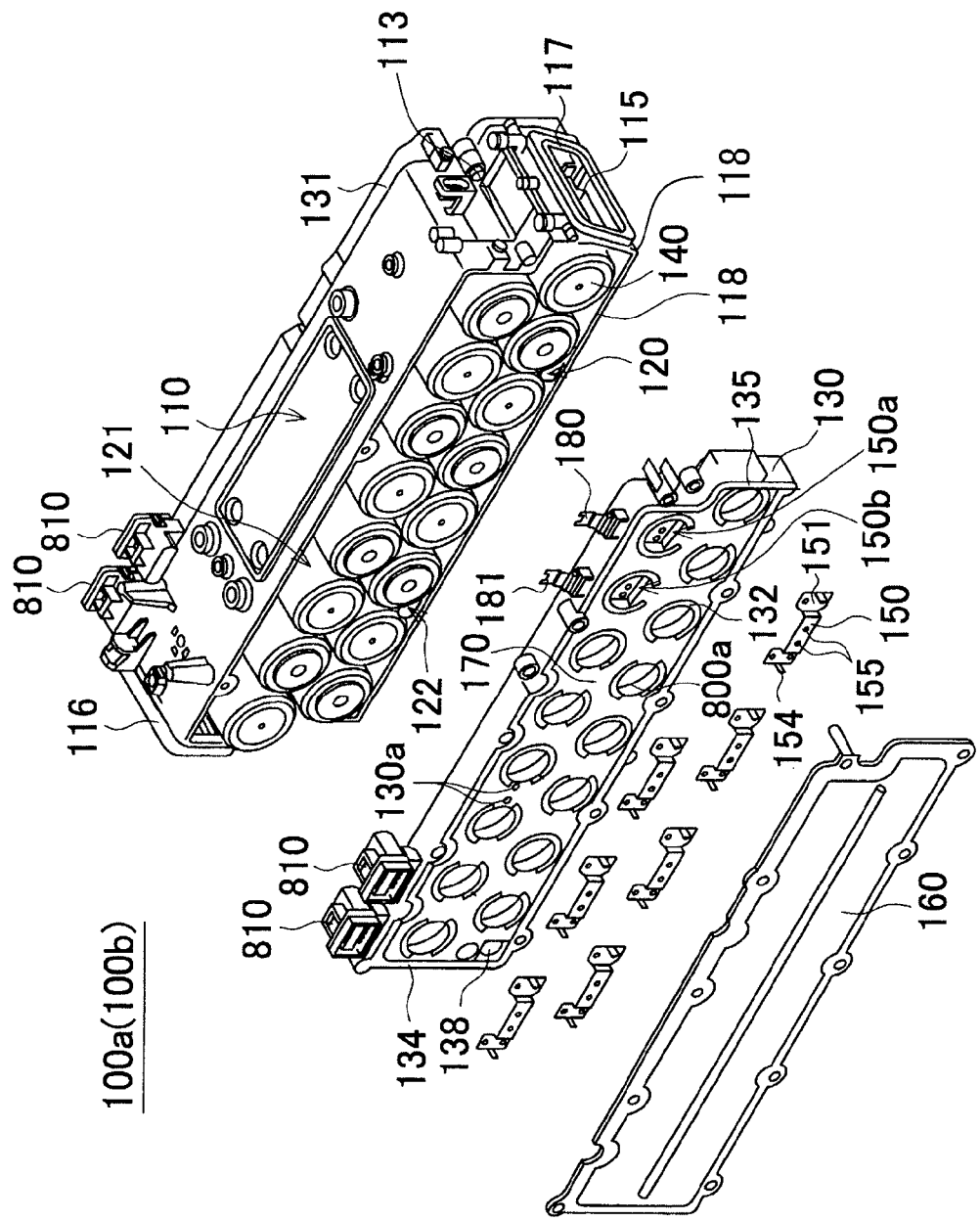
FIG. 5 is an exploded perspective view of the battery block in FIG. 4.

Next, with reference to FIGS. 2 to 10C, a configuration of the lithium ion battery device 1000 will be described. FIGS. 2 and 3 are perspective views showing an overall configuration of the lithium ion battery device 1000. FIG. 4 is a perspective view of a battery block that constitutes the lithium ion battery device 1000, and FIG. 5 is an exploded perspective view of the battery block shown in FIG. 4.

The lithium ion battery device 1000 mainly includes two units: the battery module 100 and the control device 900. A configuration of the battery module 100 will be first described.

As described above, the battery module 100 includes the high potential battery block 100a and the low potential battery block 100b, and the two battery blocks 100a and 100b are electrically connected in series. The high potential battery block 100a and the low potential battery block 100b have the same configuration. Thus, FIGS. 4 and 5 only show the high potential battery block 100a as a representative example of the high potential battery block 100a and the low potential battery block 100b, and a description on a detailed configuration of the low potential battery block 100b will be omitted.

As shown in FIG. 2, the high potential battery block 100a and the low potential battery block 100b are placed adjacent to each other in parallel so that longitudinal directions of the blocks are parallel to each other. The high potential battery block 100a and the low potential battery block 100b are placed in parallel on a module base 101, and secured by securing means such as bolts. The module base 101 is made of a rigid thin metal plate, for example, iron plate, divided into three parts in a lateral direction of the blocks, and secured to the vehicle. Specifically, the module base 101 is formed of three members placed at both ends and a middle in the lateral direction. With such a configuration, a surface of the module base 101 can be flush with lower surfaces of the battery blocks 100a and 100b, and a size of the battery module 100 in a height direction can be further reduced.

Upper portions of the high potential battery block 100a and the low potential battery block 100b are secured by a case 910 of the control device 900 described later.

As shown in FIG. 5, the high potential battery block 100a mainly includes a casing 110 (may also be referred to as a case, housing, or package) and an assembled battery 120. The assembled battery 120 is housed and held in the casing 110.

The casing 110 constitutes a substantially hexahedral block case. Specifically, the casing 110 includes six connected members: an inlet channel forming plate 111, an outlet channel forming plate 118, an inlet guide plate 112, an outlet guide plate 113, and two side plates 130 and 131. An inner space of the casing 110 functions as a housing chamber that houses the assembled battery 120, and also functions as a cooling passage through which a cooling medium (cooling air) for cooling the assembled battery 120 passes.

In the description below, a direction of the longer side of the casing 110 and a direction from a cooling medium inlet 114 toward a cooling medium outlet 115 are defined as a longitudinal direction. On the other hand, a lateral direction is defined as a direction in which two side surfaces, i.e., the two side plates 130 and 131, face each other, with the said two sides surfaces being different from the two side surfaces, i.e., the inlet guide plate 112 and the outlet guide plate 113, facing each other in the longitudinal direction of the casing 110, a direction of a central axis of the lithium ion battery cell 140 (a direction of two electrodes of a positive terminal and a negative terminal facing each other), and a direction in which a conductive member 150 that electrically connects two lithium ion battery cells 140 and the two lithium ion battery cells 140 face each other. Further, a direction of the inlet channel forming plate 111 and the outlet channel forming plate 118 facing each other is defined as a height direction irrespective of an arrangement direction of the battery module 100.

The inlet channel forming plate 111 is a rectangular flat plate that forms an upper surface of the casing 110. The outlet channel forming plate 118 is a flat plate that forms a bottom surface of the casing 110. The inlet channel forming plate 111 and the outlet channel forming plate 118 are displaced from each other in the longitudinal direction. Thus, end positions in the longitudinal direction of the inlet channel forming plate 111 and the outlet channel forming plate 118 are displaced in the longitudinal direction. The inlet channel forming plate 111 and the outlet channel forming plate 118 are made of rigid thin metal plates.

The inlet guide plate 112 is a plate member that forms one of the side surfaces facing each other in the longitudinal direction of the casing 110. The outlet guide plate 113 is a plate member that forms the other of the side surfaces facing each other in the longitudinal direction of the casing 110. The inlet guide plate 112 and the outlet guide plate 113 are made of rigid thin metal plates.

Between the inlet channel forming plate 111 and the inlet guide plate 112, a cooling medium inlet 114 is formed that constitutes an introduction port of cooling air as a cooling medium into the casing 110. The cooling medium inlet 114 includes a cooling medium inlet duct 116 for guiding the cooling air to the cooling medium inlet 114. As described above, the inlet channel forming plate 111 and the outlet channel forming plate 118 are displaced from each other, and an inlet side end of the casing 110 is formed into a step shape. Thus, a space is formed between the cooling medium inlet 114 and the inlet guide plate 112 in the longitudinal direction. This space houses a gas exhaust pipe 139 described later. As shown in FIG. 3, the inlet guide plate 112 is placed behind the gas exhaust pipe 139. With such a configuration, a size of the battery module 1000 in the longitudinal direction can be reduced. Between the outlet channel forming plate 118 and the outlet guide plate 113, a cooling medium outlet 115 is formed that constitutes a discharge port of the cooling air from the inside of the casing 110. The cooling medium outlet 115 includes a cooling medium outlet duct 117 for guiding the cooling air from the cooling medium outlet 115 to the outside.

The cooling medium inlet 114 and the cooling medium outlet 115 are displaced in the height direction, that is, a direction of the inlet channel forming plate 111 and the outlet channel forming plate 118 facing each other. Specifically, the cooling medium inlet 114 is placed closer to the inlet channel forming plate 111, and the cooling medium outlet 115 is placed closer to the outlet channel forming plate 118.

In view of an assemblability of the battery block, the inlet channel forming plate 111, the outlet guide plate 113, the cooling medium inlet 114, and the cooling medium inlet duct 116 are integrally formed, and the outlet channel forming plate 118, the inlet guide plate 112, the cooling medium outlet 115, and the cooling medium outlet duct 117 are integrally formed.

The inlet channel forming plate 111, the outlet channel forming plate 118, the inlet guide plate 112, the outlet guide plate 113, the cooling medium inlet 114, and the cooling medium outlet 115 are connected with the side plates 130 and 131 by securing means such as screws, bolts, or rivets. Between the members connected at the connection areas, seal members (not shown) are provided so that airtightness in the casing 110 is increased and the cooling medium introduced from the cooling medium inlet 114 into the casing 110 is discharged from the cooling medium outlet 115 without leaking to the outside.

The side plates 130 and 131 are flat plate members that form two side surfaces facing each other in the lateral direction of the casing 110, and are molded members made of electrically insulating resin such as PBT. The side plates 130 and 131 are thicker than the inlet channel forming plate 111, the outlet channel forming plate 118, the inlet guide plate 112, and the outlet guide plate 113. Detailed configurations of the side plates 130 and 131 will be described later.

Outside the side plates 130 and 131, that is, a side opposite to the housing chamber of the assembled battery 120 with respect to the side plates, a cover member 160, which may be referred to as a side cover or cover plate is provided. FIG. 5 shows only a cover member 160 outside the side plate 130, but a cover member 160 is also provided outside the side plate 131. The cover member 160 is secured to the side plate 130 by securing means 161 such as bolt or a rivet.

The cover plate 160 is a flat plate formed by pressing a metal plate of iron or aluminum, or a flat plate formed by molding resin such as PBT, and has substantially the same shape as a plane shape of the side plate 130. In the cover plate 160, a region including areas corresponding to through holes 132 in the side plate 130 described later is uniformly expanded or deformed to a side opposite to the side plate 130. Thus, a space is formed between the cover plate 160 and the side plate 130. The space functions as a gas release chamber or a gas release passage to which a mist gas ejected from the lithium ion battery cell 140 is released and separated from the cooling medium passing through the cooling passage.

The assembled battery 120 is an assembly of the plurality of lithium ion battery cells 140, that is, a group of lithium ion battery cells. The plurality of lithium ion battery cells 140 are arranged and housed in the housing chamber formed by the casing 110, held by the side plates 130 and 131 from the lateral direction, and electrically connected in series through the plurality of conductive members 150 referred to as bus bars.

The lithium ion battery cell 140 has a cylindrical structure in which components such as a battery element and a safety valve are housed in a battery case into which an electrolyte is injected. A positive safety valve is a cleavage valve that splits when pressure in the battery case reaches a predetermined pressure by abnormality such as overcharge. The safety valve functions as a fuse mechanism that breaks electrical connection between a battery lid and a positive side of the battery element by cleavage, and also functions as a pressure reducing mechanism that ejects a gas generated in the battery case, that is, a mist carbon dioxide gas (ejection) containing the electrolyte to the outside of the battery case.

A cleavage groove is also provided on a negative side of the battery case, and splits when pressure in the battery case reaches a predetermined pressure by abnormality such as overcharge. Thus, the gas generated in the battery case can be also ejected from a negative terminal side. A nominal output voltage of the lithium ion battery cell 140 is 3.0 to 4.2 volt, and an average nominal output voltage is 3.6 volt.

In the embodiment, sixteen cylindrical lithium ion battery cells 140 are arranged and placed in the casing 110 to constitute the assembled battery 120. Specifically, eight lithium ion battery cells 140 are placed in parallel so as to lie side by side with the central axes thereof extending in the lateral direction to constitute a first battery cell row 121. Like the first battery cell row 121, eight lithium ion battery cells 140 are placed to constitute a second battery cell row 122. The assembled battery 120 is constituted by the first battery cell row 121 and the second battery cell row 122 stacked in the height direction, stacking one on top of another or between two cells. Specifically, the assembled battery 120 is constituted by eight lithium ion battery cells 140 arranged in a row in the longitudinal direction and stacked in two steps or two tiers in the height direction.

The first battery cell row 121 and the second battery cell row 122 are displaced from each other in the longitudinal direction. Specifically, the first battery cell row 121 is displaced from the second battery cell row 122 toward the inlet channel forming plate 111 and the cooling medium inlet 114. On the other hand, the second battery cell row 122 is displaced from the first battery cell row 121 toward the outlet channel forming plate 118 and the cooling medium outlet 115. As shown in FIG. 5, in the embodiment, for example, the first battery cell row 121 and the second battery cell row 122 are displaced in the longitudinal direction so that a position in the longitudinal direction of a central axis of a lithium ion battery cell 140 located closest to the cooling medium outlet 115 in the first battery cell row 121 is located in an intermediate position between a central axis of a lithium ion battery cell 140 located closest to the cooling medium outlet 115 in the second battery cell row 122 and a central axis of an adjacent lithium ion battery cell 140 in the second battery cell row.

The lithium ion battery cells 140 that constitute the first battery cell row 121 are arranged in parallel so as to alternate their terminals. The lithium ion battery cells 140 that constitute the second battery cell row 122 are also arranged in parallel with their terminals alternately directed. However, an arrangement order of the terminals of the lithium ion battery cells 140 that constitute the first battery cell row 121 from the side of the cooling medium inlet 114 to the side of the cooling medium outlet 115 is different from an arrangement order of the terminals of the lithium ion battery cells 140 that constitute the second battery cell row 122. Specifically, in the first battery cell row 121, the terminals of the lithium ion battery cells 140 facing the side plate 130 are arranged from the side of the cooling medium inlet 114 to the side of the cooling medium outlet 115 in order of a negative terminal, a positive terminal, a negative terminal, . . . , and a positive terminal. On the other hand, in the second battery cell row 122, the terminals of the lithium ion battery cells 140 facing the side plate 130 are arranged from the side of the cooling medium inlet 114 to the side of the cooling medium outlet 115 in order of a positive terminal, a negative terminal, a positive terminal, . . . , and a negative terminal.

As such, the first battery cell row 121 and the second battery cell row 122 are displaced in the longitudinal direction, thereby reducing a size of the assembled battery 120 in the height direction, and reducing a size of the high potential battery block 110a in the height direction.

Next, configurations of the side plates 130 and 131 that hold the assembled battery 120 from opposite sides will be described. The configuration of only one side plate 130 will be described for simplicity, but the other side plate 131 basically has the same configuration as the side plate 130.

However, a battery module connection terminal 180 electrically connected to a positive side of the assembled battery 120 and a battery module connection terminal 181 electrically connected to a negative side of the assembled battery 120 are provided only on the side plate 130. The connection terminals 180 and 181 are juxtaposed in the longitudinal direction on an upper surface of the side plate 130, that is, a surface close to the inlet channel forming plate 111. A DC positive input/output terminal 183 and a negative input/output terminal 184 formed as subassemblies 185 separately from the battery module 100 are connected to the connection terminals 180 and 181. A terminal of the positive power supply cable 610 is connected to the positive input/output terminal 183 of the high potential battery block 110a, and a terminal of a cable electrically connected to one end of the SD switch 700 is connected to the negative input/output terminal 184 (see FIG. 1). A terminal of a cable electrically connected to the other end of the SD switch 700 is connected to the positive input/output terminal 183 of the low potential battery block 110b. A terminal of the negative power supply cable 620 is connected to the negative input/output terminal 184 of the low potential battery block 110b. FIG. 2 shows the subassembly 185 of the high potential battery block 100a covered with a terminal cover, and the subassembly 185 of the low potential battery block 100b with a terminal cover removed.

The side plate 130 is formed into a substantially rectangular flat plate shape as shown in FIG. 5. The side plate 130 has sixteen circular through holes 132 passing through in the lateral direction. The sixteen through holes 132 are provided in alignment with the sixteen lithium ion battery cells 140 so as to open correspondingly to electrode positions of the sixteen lithium ion battery cells 140 arranged as described above. Thus, when the assembled battery 120 is housed in the casing 110, the sixteen through holes 132 in the side plate 130 are closed by terminal surfaces on one end of the sixteen lithium ion battery cells 140, and the sixteen through holes 132 in the side plate 131 are closed by terminal surfaces on the other end of the sixteen lithium ion battery cells 140.

Figure 9:
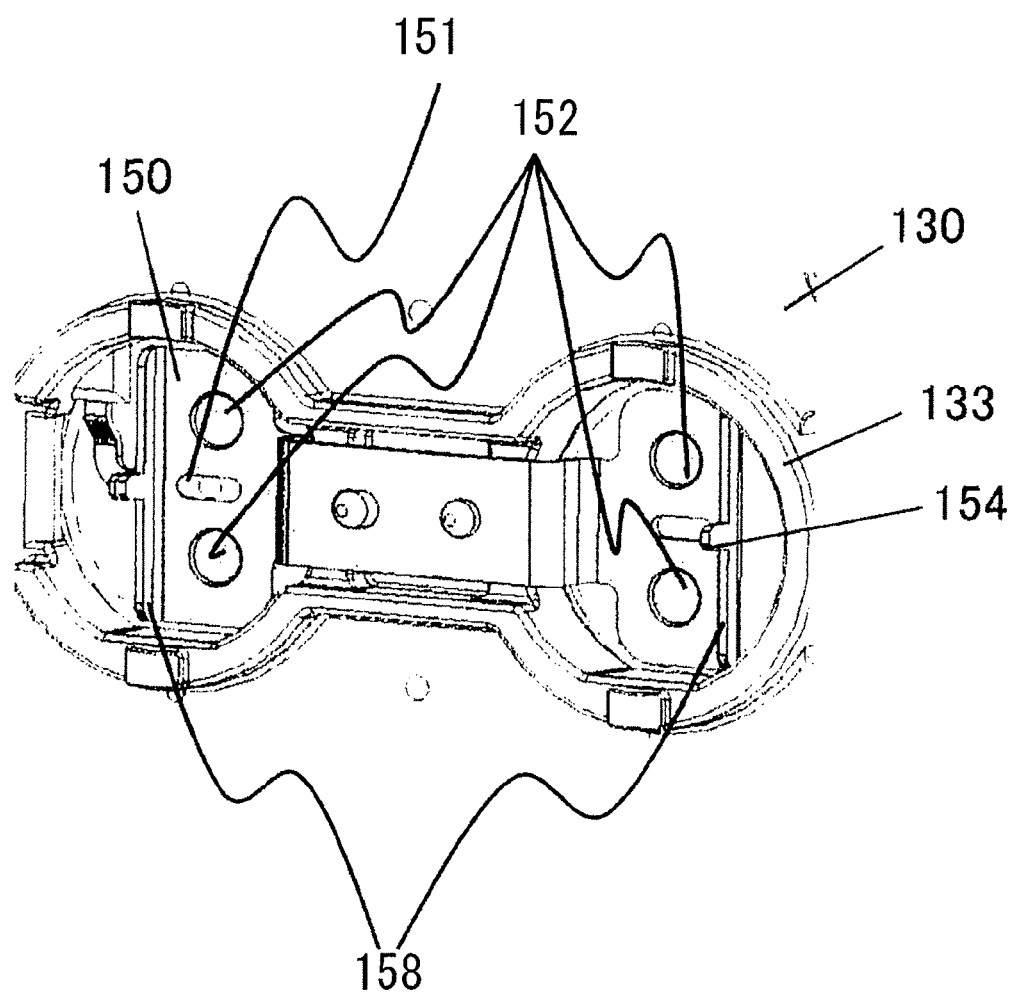
FIG. 9 is a perspective view showing a detail of the conductive member.
Figure 10:
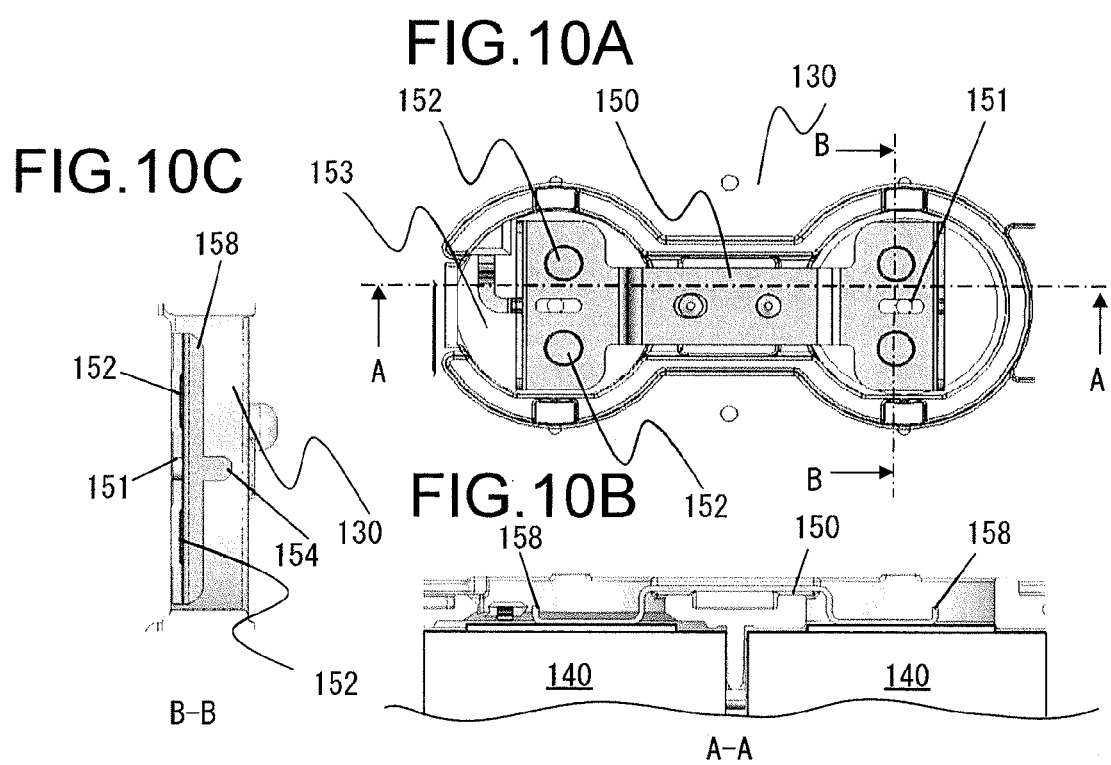
FIG. 10A shows a configuration of a joining portion between the conductive member and a lithium ion battery cell.
FIG. 10B is a sectional view taken along the line A-A in FIG. 10A.
FIG. 10C is a sectional view taken along the line B-B in FIG. 10A.

In the side plate 130, on the outer wall surface 170 on the other side of an inner wall surface that forms the housing chamber of the assembled battery 120, a protrusion (peripheral wall) 133 is formed so as to partially surround the through hole 132. In FIG. 5, the peripheral wall 133 is provided so as to surround only the through hole 132 provided in the side plates 130 and 131, but as shown in FIG. 9 and FIG. 10A, the peripheral wall 133 actually surrounds the entire conductive member 150. The peripheral wall 133 surrounds the through hole 132, and also extends along a middle portion 156 of the conductive member 150 between the two through holes 132. However, the peripheral wall 133 is not provided near a position around the through hole 132 where a tip 800a of the voltage detection conductor 805 described later is placed.

Further, on the outer wall surface 170, a plurality of securing guides 130a for placing the conductive members 150 to be connected to the lithium ion battery cells 140 are formed between the through holes 132. The peripheral wall 133 and the securing guides 130a protrude from the outer wall surface 170 to prevent contact between the cover member 160 and the conductive member 150. A height of the peripheral wall 133 from the side plates 130 and 131 is preferably higher than a height of the securing guides 130a from the side plates 130 and 131. Thus, when the cover member 160 is formed of, for example, a flat plate of metal such as iron, and deformed by an external force, the cover member 160 is first brought into contact with the peripheral wall 133, thereby reliably preventing a short circuit between the cover member 160 and the conductive member 150.

In the side plate 130, a gas exhaust passage 138 is provided for exhausting a gas (a gas with a mixture of a liquid containing an electrolyte and gas) released to the gas release chamber between the side plate 130 and the cover member 160 to the outside of the high potential battery block 100a. An opening of the gas exhaust passage 138 is formed in a lower portion of the side plate 130 in view of discharge of the liquid such as electrolyte contained in the said gas. Specifically, the opening is formed in the side plate 130 at a position closer to the cooling medium inlet 140 and the outlet channel forming plate 118. A tip of the gas exhaust passage 138 is formed into a pipe shape, to which a gas exhaust pipe 139 (see FIG. 3) for guiding the gas exhausted from the gas exhaust passage 138 to the outside is connected.

On the upper surface of the side plate 130, that is, the surface on the side of the inlet channel forming plate 111, two connection terminals 810 are juxtaposed in the longitudinal direction. The connection terminals 810 are molded of the same molding material as the side plate 130 integrally with the side plate 130, and placed on the upper surface of the side plate 130 on the side of the cooling medium inlet 114. Each connection terminal 810 includes a current breaking portion 811, and electrically connects a wire (connection line) 800 extending from a voltage detection connector 912 of the control device 900 and the voltage detection conductor 805 described later via the current breaking portion 811. The voltage detection connector 912 is provided at each end of the control device 900 in the lateral direction. The connection line 800 connected to the connection terminal 810 provided in the high potential battery block 100a is connected to the connector 912 of the control device 900 placed on the high potential battery block 100a. On the other hand, the connection line 800 connected to the connection terminal 810 provided in the low potential battery block 100b is connected to the connector 912 of the control device 900 placed on the low potential battery block 100b. A length of the connection line 800 is set correspondingly to a distance from each connection terminal 810 to the corresponding connector 912 so as to prevent a wiring error. For example, the connection line 800 connected to the connection terminal 810 of the high potential battery block 100a is set to be short so as not to reach the connector 912 of the low potential battery block 100b. The current breaking portion 811 includes a fuse wire, and has a function of blowing in abnormality of the control circuit 900 or the wire 800 to break a current from the assembled battery 120 and protect a product.

Figure 6:
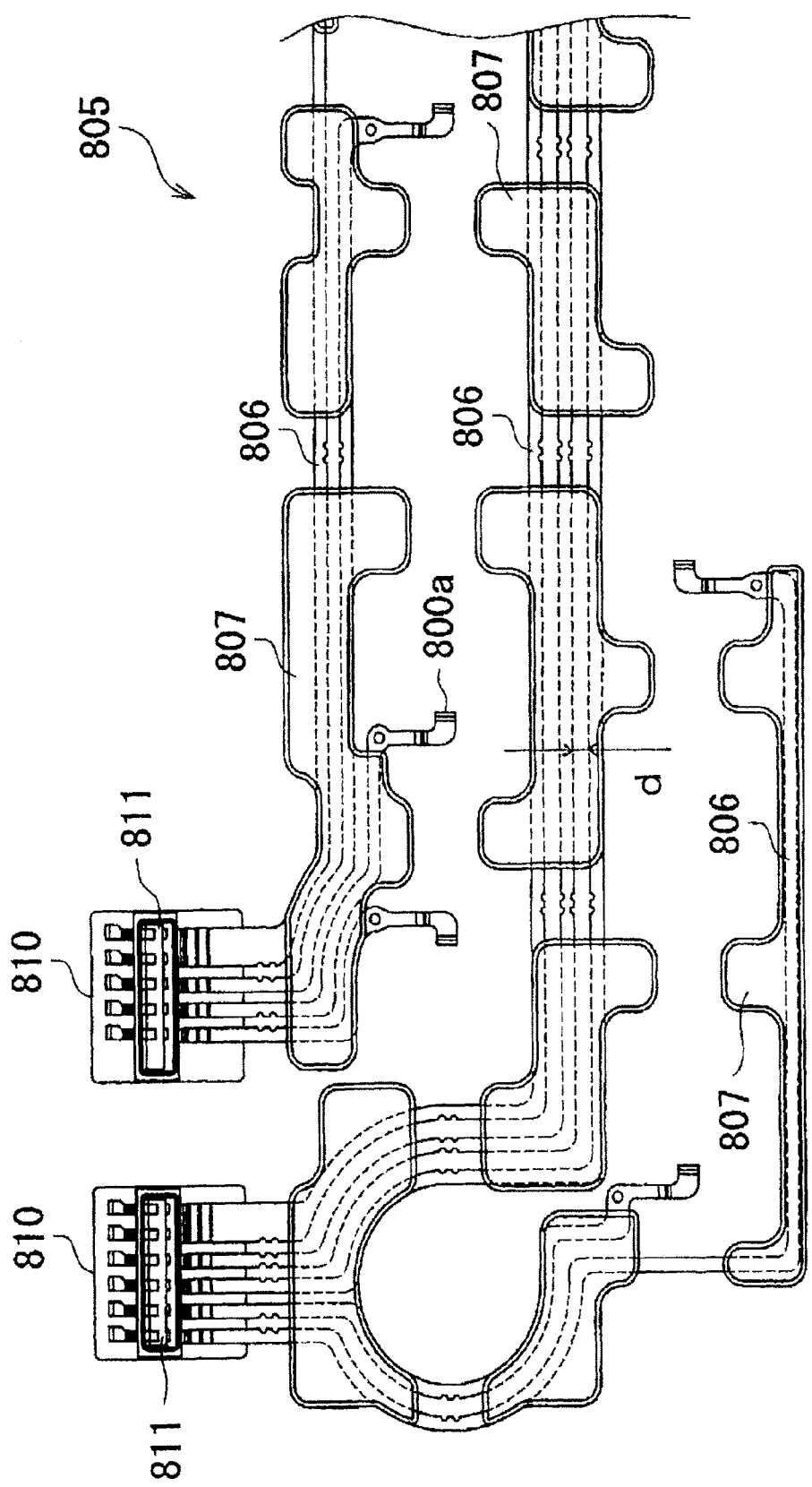
FIG. 6 shows a configuration of voltage detection conductors.
Figure 7:
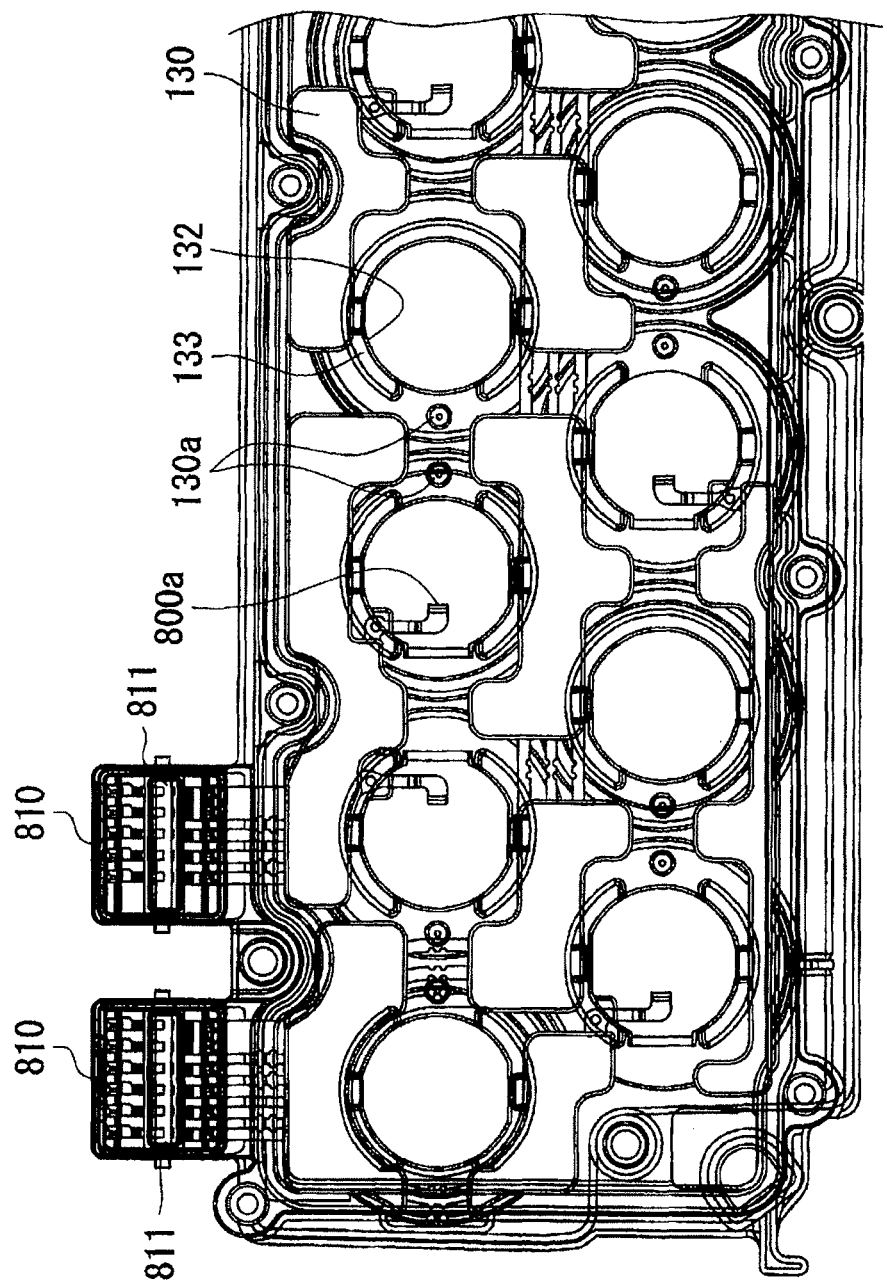
FIG. 7 shows a state where the voltage detection conductors are integrated into a side plate.

The voltage detection conductor 805 is connected to the conductive member 150 that connects the lithium ion battery cells 140 in series in order to detect a voltage of each of the plurality of lithium ion battery cells 140 that constitute the assembled battery 120. The voltage detection conductor 805 is integrated with the side plate 130, specifically, embedded in the side plate 130. FIG. 6 shows an example of a shape of the voltage detection conductor 805, and FIG. 7 shows a state where the voltage detection conductor 805 shown in FIG. 6 is embedded in the side plate 130.

The voltage detection conductor 805 forms elongated rectangular wire shaped detection lines 806 as shown in FIG. 6 by forming a thin plate of metal such as copper by pressing or the like. The voltage detection conductor 805 is configured so that the detection lines 806 extend so as not to protrude from the plurality of through holes 132 formed in the side plate 130, and the tip 800a of each detection line 806 is exposed from a predetermined through hole 132. The tip 800a is bent outward with respect to the housing chamber of the assembled battery 120 and connected to the conductive member 150. The other end opposite to the tip 800a of the voltage detection conductor 805 is electrically connected to the connection terminal 810 via the current breaking portion 811.

The shape of the voltage detection conductor 805 is designed to efficiently use an available space of the side plate 130 so as to reduce the size of the side plate 130 and then to reduce the size of the entire battery module 100. The plurality of lithium ion battery cells 140 are connected in series via the conductive members 150, and thus a potential difference is generated among the plurality of conductive members 150 to which the voltage detection conductor 805 is connected. Thus, in the voltage detection conductor 805, arrangement of the detection lines 806 are determined so as to minimize a potential difference between adjacent detection lines 806. The configuration of the voltage detection conductor 805 is not limited to the configuration shown in FIG. 6, but may be changed depending on specifications or the like.

The voltage detection conductor 805 is formed into a predetermined shape by pressing or the like, and then secured in its shape by a resin portion 807 made of, for example, the same resin as the side plate 130. Specifically, the resin portion 807 separates the plurality of detection lines 806 and maintains the shape of each detection line 806. The voltage detection conductor 805 shown in FIG. 6 includes two sub units with the detection lines 806 being secured at a plurality of areas by the resin portions 807.

As shown in FIG. 6, the voltage detection conductor 805 secured by the resin portion 807 is integrated with the side plate 130 by insert molding with, for example, resin that forms the side plate 130. Since the detection lines 806 are separately secured, a short circuit between the detection lines 806 does not substantially occur after the voltage detection conductor 805 is integrated with the side plate 130. In order to prevent a short circuit between the detection lines 806 in the voltage detection conductor 805, an insulation creepage distance needs to be ensured for a distance d between the detection lines 806. The insulation creepage distance is determined by usage environment and a voltage of a system according to the international standard.

However, in this embodiment, in view of a degree of pollution of the environment where the system including the electric storage module according to this embodiment is to be used, the distance d between the detection lines 806 is set larger than the insulation creepage distance in order to further increase reliability for a short circuit between the detection lines 806. A larger distance d is more effective for environment with a higher degree of pollution, but an available space of the side plate 130 is limited. Thus, in this embodiment, in view of preventing a short circuit and the space of the side plate 130, the distance d between the detection lines 806 is 2 to 2.5 times the insulation creepage distance required in this system. This can provide a reliable side plate 130.

Figure 8:
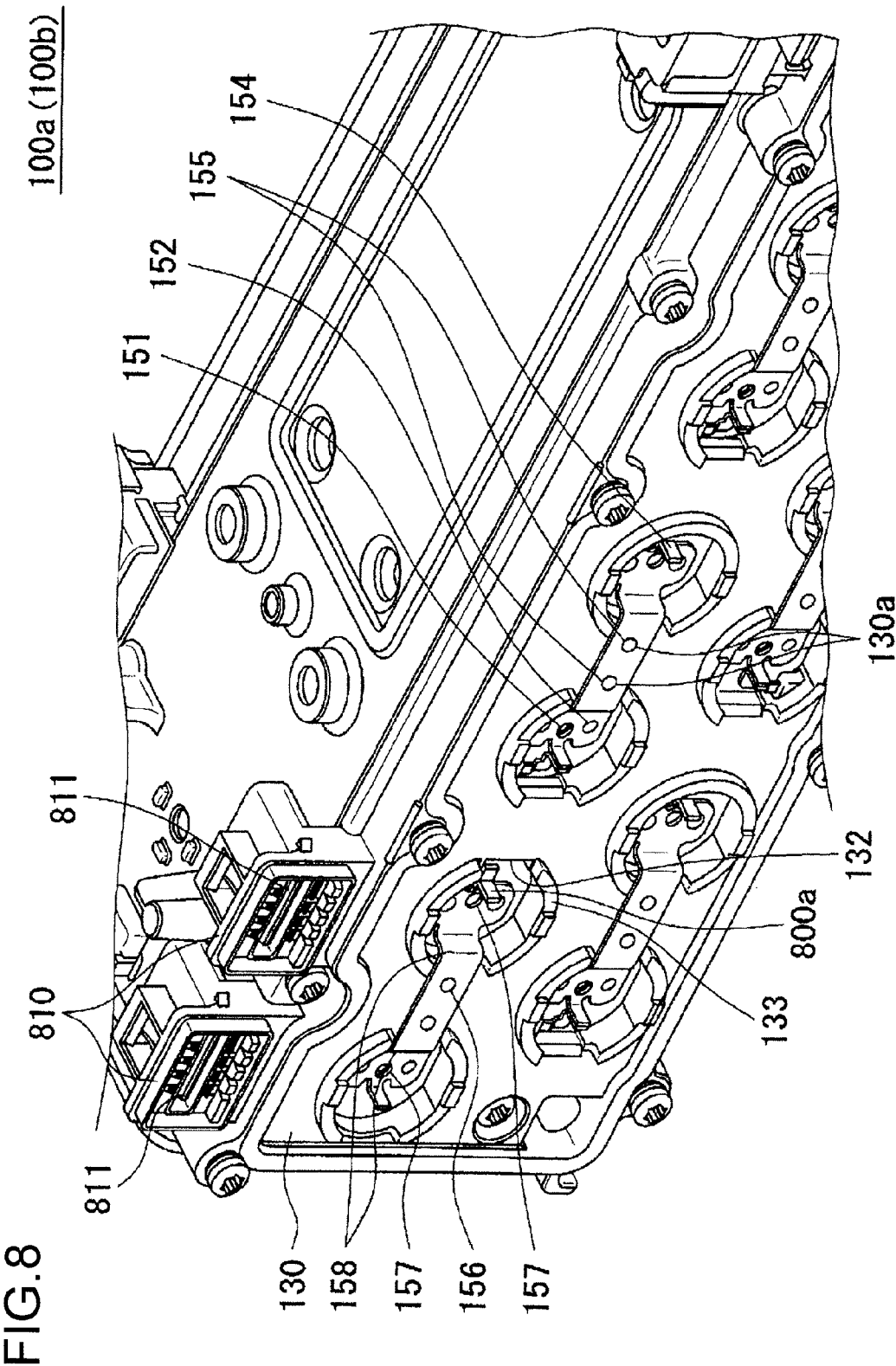
FIG. 8 is a perspective view of the battery block showing a state where conductive members are mounted to the side plate.

FIG. 8 is a partial perspective view of the high potential battery block 100*a*, and shows a state where the conductive members 150 are mounted to the side plate 130 and connected to the lithium ion battery cells 140. The conductive member 150 is a plate member of metal, for example, copper that electrically connects between the lithium ion battery cells 140, and configured separately from the side plate 130. However, as shown in FIG. 5, a conductive member 150*a* integrally formed with the connection terminal 180 and a conductive member 150*b* integrally formed with the connection terminal 181 are integrally formed with the side plate 130.

The conductive member 150 includes a middle portion 156 extending in a strip shape, and ends 157 at opposite ends of the middle portion 156. The middle portion 156 and the ends 157 are continuous via bent portions 158. Specifically, the conductive member 150 is bent and formed into a step shape. Each end 157 of the conductive member 150 has a through hole 151, two joining areas 152 to be connected to the terminal surface of the lithium ion battery cell 140, and a welding area 154 to be connected to the tip 800*a* of the voltage detection conductor 805. The through hole 151 is provided so that when a gas is ejected from the lithium ion battery cell 140 as described above, the ejected gas passes through the through hole 151. The middle portion 156 of the conductive member 150 has two through holes 155 through which the securing guides 130*a* provided on the side plate 130 are inserted. In this embodiment, the through hole 151 is formed into an oval shape, but may be a circular shape.

The conductive member 150 is mounted to the side plate 130 so that the two through holes 155 in the middle portion 156 fit the two securing guides 130*a* provided on the side plate 130. When the conductive member 150 is mounted to the side plate 130, the opposite ends 157 of the conductive member 150 fit in the through holes 132 and abut against the terminal surfaces of the lithium ion battery cells 140. The welding area 154 of the conductive member 150 abuts against the tip 800*a* of the voltage detection conductor 805 exposed from the through hole 132 formed in the side plate 130. Because of a connection structure of the lithium ion battery cells 140, the tip 800*a* is not exposed from some of the through holes 132 as shown in FIG. 7.

FIG. 9 is a perspective view showing a detail of the conductive member 150, and shows a state where the conductive member 150 is mounted to the side plate 130. FIG. 10A shows a configuration of a joining portion between the conductive member 150 and the lithium ion battery cell 140. FIG. 10B is a sectional view taken along the line A-A in FIG. 10A, and FIG. 10C is a sectional view taken along the line B-B in FIG. 10A.

The conductive member 150 is fusion-joined to the lithium ion battery cell 140 via the joining areas 152 provided at the opposite ends 157. Specifically, a welding torch is positioned on the joining area 152 to join the joining area 152 and the lithium ion battery cell 140 by arc welding. The arc welding includes, for example, TIG welding, gas shield arc welding, or the like. The arc welding fuses and joins a base material and filler metal with high heat, and generates ultra-high heat in welding. Thus, under a strict welding condition, the through hole 151 close to the joining area 152 or a corner at the end 157 may be melted by heat in welding. If the corner at the end 157 is melted, a fusion area of the end 157 to be joined to the lithium ion battery cell 140 is reduced, and satisfactory joining between the conductive member 150 and the lithium ion battery cell 140 may not be obtained. As described above, the through hole 151 functions as an exhaust port of a gas when the gas is ejected from the lithium ion battery cell 140, and thus it is necessary to prevent the end 157 from being melted to close the opening.

Thus, in this embodiment, as shown in FIG. 9, a rising portion 158 is provided at each end 157 of the conductive member 150. The rising portion 158 has a function of sufficiently releasing heat in welding when the joining area 152 and the lithium ion battery cell 140 are fusion-joined. Further, in order to avoid an influence of heat generated in welding, the through hole 151 is formed as far from the joining area 152 as possible. Specifically, the through hole 151 is formed into an oval shape. The oval through hole 151 is placed in an intermediate position between two joining areas 152 provided in one end 157. Thus, the rising portion 158 is provided at each end 157 of the conductive member 150 and the through hole 151 is formed into the oval shape to prevent the through hole 151 from being melted while performing efficient heat dissipation in welding, thereby allowing an acceptable range of a welding condition with allowance to be set in view of variations in components.

As described above, in this embodiment, four joining areas 152 are provided in the conductive member 150. Thus, two joining areas 152 are provided for one lithium ion battery cell 140. The number of joining points between the conductive member 150 and the lithium ion battery cell 140 differs depending on specifications or the like of the battery module. The joining area 152 is formed as a circular projection protruding toward the lithium ion battery cell 140. The circular joining area 152 functions as a welding start point with the lithium ion battery cell 140 in welding. A diameter of the joining area 152 is determined in view of variations of a torch position of welding equipment and variations by combinations of components of the lithium ion battery device 1000. Specifically, the size of the joining area 152 is set so that the welding torch is able to be located in the circle of the joining area 152 in welding in any case, thereby allowing stable welding with high quality.

Next, the control device 900 included in the lithium ion battery device 1000 will be described. As shown in FIGS. 2 and 3, the control device 900 is placed on the battery module 100. Specifically, the control device 900 is an electronic circuit device placed over the high potential battery module 100*a* and the low potential battery module 100*b*, and includes the case 910 and one circuit board housed in the case 910.

The case 910 is a flat rectangular parallelepiped box made of metal, and secured to the high potential battery module 100*a* and the low potential battery module 100*b* by securing means such as a bolt or a screw. Thus, the high potential battery module 100*a* and the low potential battery module 100*b* are connected and secured at ends in the lateral direction through the control device 900. Specifically, the control device 900 also functions as a support, thereby further increasing strength of the battery module 100.

A plurality of connectors are provided on a side surface of the case 910, that is, on opposite end surfaces of the control device 900 in the lateral direction. The plurality of connectors include the voltage detection connectors 912, a temperature detection connector 913, and an external connection connector 911. To the voltage detection connectors 912, connectors of the connection lines 800 electrically connected to thirty-two lithium ion battery cells 140 are connected. To the temperature detection connector 913, connectors of signal wires of a plurality of temperature sensors (not shown) placed in the battery module 100 are connected.

To the external connection connector 911, connectors (not shown) of a power supply line for supplying driving power to the battery controller 300, a signal wire for inputting on/off signals of an ignition key switch, and a communication line for CAN communication with the vehicle controller 30 and the motor controller 23 are connected.

Figure 11:
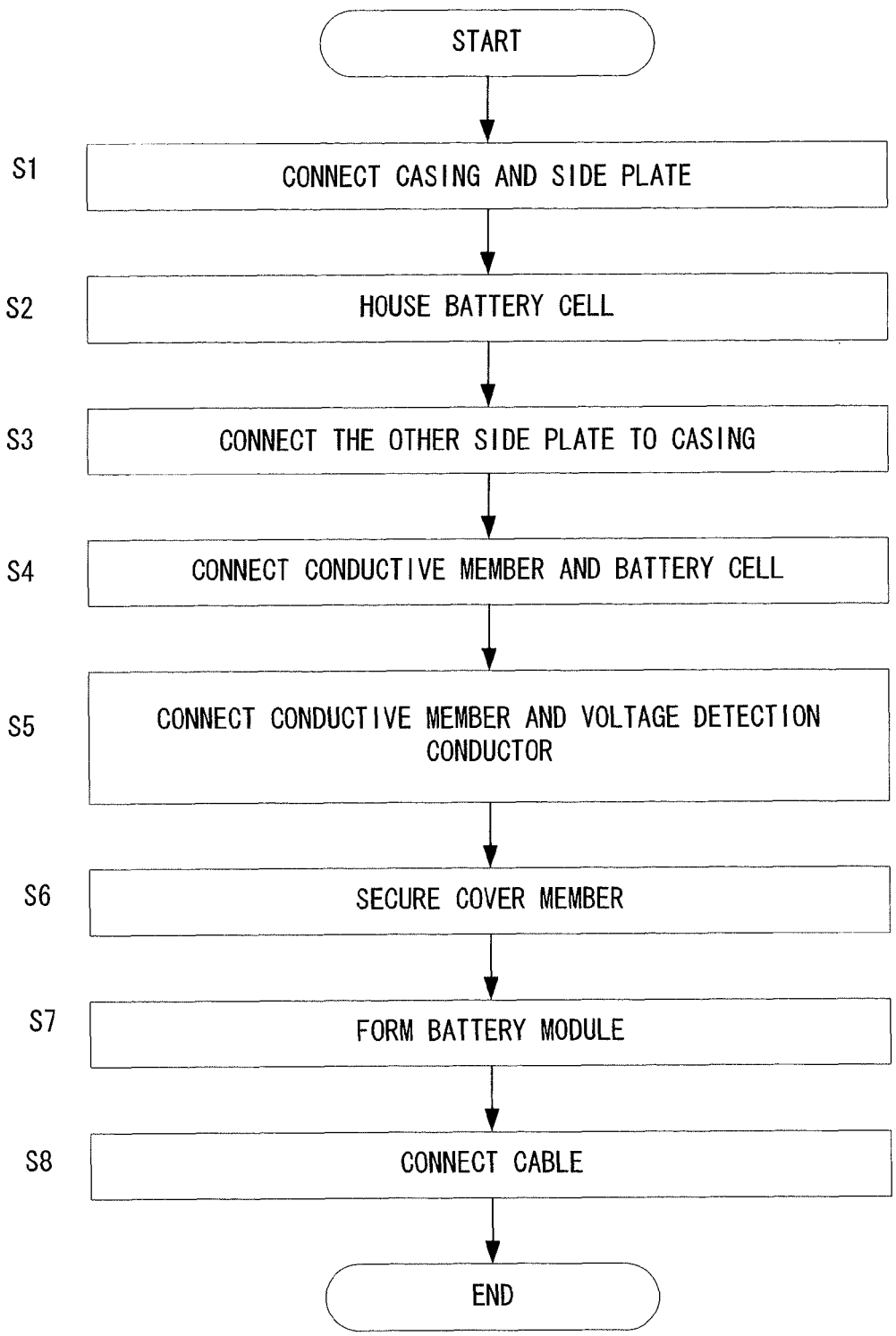
FIG. 11 is a flowchart illustrating a production procedure of the lithium ion battery device.

A production method, particularly, an assembling method of the lithium ion battery device 1000 constituted by the battery module 100 and the control device 900 described above will be described with reference to a flowchart in FIG. 11.

First, in Step S1, assembling of the high potential battery block 100a and the low potential battery module 100b is started. The inlet channel forming plate 111, the outlet guide plate 113, the cooling medium inlet 114, and the cooling medium inlet duct 116 are integrated with the outlet channel forming plate 118, the inlet guide plate 112, the cooling medium outlet 115, and the cooling medium outlet duct 117. The assembly thus integrated is secured via a seal member (not shown) to one of the side plates 130 and 131, for example, the side plate 130 by securing means such as a bolt, a screw, or a rivet, and placed with the side plate 130 facing down.

In step S2, each lithium ion battery cell 140 is attached to the side plate 130 using an adhesive (adhesive member). The adhesive has appropriate flexibility, and has a function of bonding the side plate 130 and the lithium ion battery cell 140 and a function of sealing between the both. The adhesive having flexibility is used to ensure airtightness and liquid tightness between the cooling passage inside the casing 110 including the side plate 130 and the gas release chamber outside the casing 110. Also, even if, for example, vibration is applied to the battery module 100, the vibration can be absorbed by the adhesive and a connection state between the side plate 130 and the lithium ion battery cell 140 can be maintained. As the adhesive member, a liquid gasket having the above function may be used.

In step S3, the side plate 131 is assembled to the assembly formed in step 2 using an adhesive (adhesive member) as in step 2. Then, as in step 1, the assembly is secured with the side plate 131 by securing means such as a bolt, a screw, or a rivet. Thus, the assembled battery 120 is housed in the casing 110.

In step S4, each lithium ion battery cell 140 and the conductive member 150 are connected. First, as shown in FIG. 8, through holes 155 in the conductive member 150 are fitted on the securing guides 130a on one of the side plates 130 and 131, for example, the side plate 130, to mount the conductive member 150 to the side plate 130. Then, the welding area 152 of the conductive member 150 is joined to a terminal surface of a corresponding lithium ion battery cell 140 by arc welding, for example, TIG welding. Similarly, the conductive members 150 are also mounted to the other of the side plates 130 and 131, that is, the side plate 131 to join the welding areas 152 of the conductive members 150 and the lithium ion battery cells 140 by TIG welding.

Then in step S5, the conductive member 150 and the tip 800a of the voltage detection conductor 805 are connected. Specifically, the abutment area 154 of the conductive member 150 is abutted against the tip 800a of the voltage detection conductor 805, and the welding area 154 and the tip 800a are joined by TIG welding.

In step S6, the cover member 160 is assembled to each of the side plates 130 and 131 via a seal member 135, and secured by securing means 161 such as a bolt, a screw, or a rivet. The seal member 135 is an annular elastic seal member, for example, a rubber O-ring, and fitted into a groove 134 formed in each of the side plates 130 and 131. A liquid gasket may be used as the seal member 135.

Then in step S7, two assemblies, i.e., the battery blocks 100a and 100b, produced in step S6 are placed so that longitudinal directions of the assemblies are parallel to each other, and the module base 101 is assembled to the battery blocks 100a and 100b with the two battery blocks 100a and 100b placed in parallel. The module base 101 is secured to a bottom of the casing 110 by securing means such as a bolt, a screw, or a rivet. The case of the control device 900 is secured to a middle portion in the longitudinal direction of the two battery blocks 100a and 100b by securing means such as a bolt, a screw, or a rivet. Thus, the battery module 100 is formed.

An assembling order of the components that constitute the battery module 100 is not limited to the above, and a securing order of the components may be changed.

Next, in step S8, the connectors of the connection line 800 are connected to the connection terminal 810 of the battery module 100 and to the connector 912 of the control device 900. The connectors of signal wires extending from a plurality of temperature sensors (not shown) provided in the battery blocks 100a and 100b of the battery module 100 are connected to the connector 913 of the control device 900. Further, the connector of a communication line for communication with a host control device, for example, the vehicle controller 30 and the motor controller 23 is connected to the connector of the control device 900.

By the assembling process in steps S1 to S8 above, the lithium ion battery device 1000 is completed.

With the electric storage module (battery module 100) and the electric storage device (lithium ion battery device 1000) according to the embodiment described above, the following operation and effect can be obtained.

(1) The battery module 100 includes the plurality of electric storage units 140, the case (casing) 110 that houses the plurality of electric storage units (lithium ion battery cells) 140, the pair of resin side plates 130 and 131 that hold and support at least the plurality of electric storage units 140 from opposite sides, and the plurality of conductive members 150 for electrically connecting the plurality of electric storage units 140. The plurality of conductive members 150 are mounted to the side plates 130 and 131 from outside the casing 110 for connecting the plurality of electric storage units 140. This facilitates connection between the conductive member 150 and each electric storage units 140. In the embodiment described above, the conductive member 150 and each lithium ion battery cell 140 are fusion-joined by arc welding or the like. The electric storage module 100 includes the metal cover members 160 that cover the casing 110 on the outside of the pair of side plates 130 and 131. On the side plates 130 and 131, the peripheral walls 133 protruding from the side plates 130 and 131 are provided so as to surround each conductive member 150, thereby preventing a short circuit caused by contact between, for example, the iron cover members 160 and the conductive members 150. As shown in FIGS. 8 to 10C, the peripheral wall 133 surrounds the entire conductive member 150 except near the position where the tip 800a of the voltage detection line 806 is placed, and thus can bear various external forces such as when the cover member 160 is deformed inward of the casing 110 by an external force. Also, in order to prevent contact between the cover member 160 and the conductive member 150, the securing guides 130a protruding from the surfaces of the side plates 130 and 131 are further provided on the side plates 130 and 131 as shown in FIG. 8. The height of the peripheral wall 133 from the side plates 130 and 131 is preferably equal to or higher than the height of the securing guide 130*a* from the side plates 130 and 131. This can reliably prevent a short circuit between the cover member 160 and the conductive member 150.

(2) In the battery module 100, the plurality of electric storage units 140 and the conductive members 150 are fusion-joined, and each conductive member 150 has the walls 158 for heat dissipation in fusion-joining. If the conductive member 150 is melted by high heat generated in fusion-joining, there is a possibility that the conductive member 150 is not satisfactorily fusion-joined to the electric storage unit 140. Thus, the wall 158 is provided on the conductive member 150 to efficiently release heat in welding to perform satisfactory welding, thereby providing reliable side plates 130 and 131.

(3) The conductive member 150 is fusion-joined to the end surfaces of the electric storage unit 140 at the opposite ends (end regions) 157. The opposite ends 157 have the through holes 151 through which a gas ejected from the electric storage unit 140 in abnormality passes. The through hole 151 is formed into the oval shape so as to function as a gas releasing opening, and avoid an influence of high heat in welding.

(4) The height of the wall 158 of the conductive member 150 is set to be lower than the height of the cover member 160 mounted to the side plates 130 and 131 when the conductive member 150 and the electric storage unit 140 are fusion-joined. This can prevent undesirable contact between the metal cover member 160 and the wall 158 while ensuring a heat dissipation function.

(5) The battery module 100 further includes the voltage detection conductor 805 for detecting the voltage of each electric storage unit 140. The voltage detection conductor 805 is formed to have the plurality of detection lines 806 corresponding to the positions of the plurality of conductive members 150, and the distance d between the plurality of detection lines 806 is set to 2 to 2.5 times the insulation creepage distance determined by the voltage of the battery module 100. This can reliably prevent a short circuit between the detection lines 806 even with a high degree of pollution of the environment where the battery module 100 is used.

(6) The tips 800*a* of the voltage detection conductor 805 are connected to the plurality of conductive members 150, and the current breaking device (current breaking portion) 811 that breaks the current from the electric storage unit 140 is provided at the other end of the voltage detection conductor 805. The current breaking portion 811 causes the fuse wire to blow in abnormality of the control circuit 900 and the wire 800 to break the current from the assembled battery 120, thereby protecting a product. The current breaking portion 811 is provided at the other end of the voltage detection conductor 805, and thus for example, when a short circuit occurs in the wire 800, the current breaking portion 811 breaks the current at the other end of the voltage detection conductor 805. This can protect the entire battery module 100. In this case, the wire 800 and the current breaking portion 811 can be replaced to allow reuse of the battery module 100. The voltage detection conductor 805 is formed into the predetermined shape and integrated with each of the side plates 130 and 131, and thus a short circuit does not substantially occur in the voltage detection conductor 805 itself.

(7) The voltage detection conductor 805 is maintained in the predetermined shape by the resin material (resin portion) 807 and insert-molded with each of the resin side plates 130 and 131, and thus integrated with each of the side plates 130 and 131. Specifically, the voltage detection conductor 805 is secured by the resin portion 807 so as to maintain the shape to create the sub units, and the sub units are insert-molded to produce the side plates 130 and 131. The sub units are created to reliably maintain the shape of the voltage detection conductor 805, thereby preventing contact between the detection lines 806 of the voltage detection conductor 805 by mistake in the production process.

(8) The side plates 130 and 131 have the through holes 132 in the positions corresponding to the plurality of electric storage units 140, and the plurality of electric storage units 140 are attached to the side plates 130 and 131 using an adhesive member so as to tightly close the through holes 132. Thus, a seal can be provided between the inside and the outside of the casing 110. A connection state between the side plates 130 and 131 and the electric storage units 140 can be maintained, with the external force, for example, vibration applied to the battery module 100 being absorbed by the adhesive member.

(9) The electric storage device (lithium ion battery device) 1000 includes the battery module 100, and the control device 900 that is connected to the voltage detection conductor 150 to detect the voltage of the plurality of electric storage units 140 and to control an electric storage amount of the plurality of electric storage units 140. As described above, the battery module 100 can be produced without a complex wiring of the voltage detection lines, thereby allowing the entire electric storage device 1000 to be efficiently produced.

In the embodiment described above, the voltage detection conductor 805 formed into the predetermined shape is insert-molded and integrally molded with the side plates 130 and 131, but the integrating method of the voltage detection conductor 805 and the side plates 130 and 131 is not limited to this. For example, each of the side plates 130 and 131 may be formed of two members, and the voltage detection conductor 805 formed into a predetermined shape may be fitted between the two members to be integrated with each of the side plates. However, when the voltage detection conductor 805 is fitted and integrated with each of the side plates 130 and 131, the side plates 130 and 131 may be thicker than the side plates 130 and 131 molded by insert molding. Thus, in terms of the thicknesses, the side plates 130 and 131 and the voltage detection conductor 805 are preferably integrally molded by insert molding. Instead of the voltage detection conductor 805 being included in the side plates 130 and 131, the voltage detection conductor 805 may be placed on the side plates 130 and 131. Also in this case, the tip 800*a* of the voltage detection conductor 805 is connected to the welding area 154 of the conductive member 150.

In the embodiment described above, the battery module 100 is exemplified including the two battery blocks 100*a* and 100*b* in which the sixteen lithium ion battery cells 140 are connected. However, the present invention is not limited to the configuration or a connection type (series or parallel) of the battery module 100 described above, but may be applied to configurations with a different number of lithium ion battery cells 140, a different number of battery cell rows, different arrangement, or different orientations.

In the embodiment described above, the cylindrical battery is exemplified as the lithium ion battery cell 140, but the present invention is not limited to this. For example, the present invention may also be applied to a lithium ion battery cell 140 of a prismatic storage battery or a laminate seal battery, and batteries other than the lithium ion battery such as a nickel hydrogen battery.

The electric storage device 1000 according to the embodiment described above may be used in a vehicle power supply device of other electric vehicles, for example, a railway vehicle such as a hybrid train, a passenger automobile such as a bus, a cargo automobile such as a truck, an industrial vehicle such as a battery type forklift truck.

The electric storage device 1000 according to the embodiment may be applied to an electric storage device that constitutes a power supply device of other than an electric vehicle such as an uninterruptible power supply device used in a computer system or a server system, or a power supply device used in private power generation equipment.

According to the present embodiment described above, an electric storage module and an electric storage device including a side plate with low cost and high reliability can be provided.

The above described embodiments are examples, and various modifications can be made without departing from the scope of the invention.

What is claimed is:

1. An electric storage module, comprising:
    a plurality of electric storage units;
    a casing that houses the plurality of electric storage units, and includes a pair of resin side plates, having an inner wall surface facing the plurality of electric storage units and an outer wall surface opposite to the inner wall surface, that hold and support at least the plurality of electric storage units from opposite sides;
    a plurality of conductive members for electrically connecting the plurality of electric storage units, that is arranged on each outer wall surface of the pair of side plates and is separate from the side plates; and
    a metal cover member that is attached to the outer wall surface of each of the side plates and covers the outer wall surface of each of the side plates in a state where the plurality of conductive members is arranged on the pair of side plates; wherein:
        the side plates include a plurality of through holes that are provided corresponding to the plurality of electric storage units, respectively, and a plurality of peripheral walls that are provided corresponding to the plurality of conductive members, respectively;
        an opening of each of the plurality of through holes at the inner wall surface is closed by a terminal surface of a corresponding electric storage unit;
        a gas release chamber is formed between the outer wall surface of each of the side plates and the cover member, wherein the gas release chamber is fluid-tightly separated from an inner space of the casing in which the electric storage units are housed and in which a cooling medium flows, and in case where a gas is ejected from the electric storage units, the gas ejected from the electric storage units is released to the gas release chamber, the gas release chamber including an exhaust passage connected to an exhaust mechanism for discharging to an outside the ejected gas that is kept separated from the cooling medium;
        each of the conductive members includes a middle portion and end portions that are formed at opposite ends of the middle portion and extend from the middle portion into the through holes and are connected to terminal surfaces of two corresponding electric storage units;
        each of the peripheral walls is a mechanism to prevent contact between a corresponding one of the conductive members and the cover member, and protrudes from the outer wall surface of each of the side plates toward the cover member so as to surround the corresponding one of the conductive members;
        a height of each peripheral wall from the outer wall surface of each of the side plates is higher than a height of the middle portion of each of the conductive members from the outer wall surface of each of the side plates, and smaller than a distance from the outer wall surface of each of the side plates to the cover member;
        the side plates include guide members that connect the conductive members;
        the guide members protrude toward the cover member from each outer wall surface of the pair of side plates; and
        each guide member is inserted through a through hole provided in the middle portion of each of the conductive members.

2. An electric storage module according to claim 1, wherein: the height of each peripheral wall from the outer wall surface of each of the side plates is equal to or higher than a height of the guide members from the outer wall surface of each of the side plates.

3. An electric storage module according to claim 1, further comprising:
    a voltage detection conductor that detects a voltage of each of the plurality of electric storage units;
    the voltage detection conductor is embedded in the side plates, and a tip portion of the voltage detection conductor is exposed from a predetermined through hole in the side plates so as to be connected with a conductive member corresponding to the predetermined through hole; and
    the peripheral walls are provided except at a position where the tip portion of the voltage detection conductor is placed.

4. An electric storage module according to claim 3, wherein:
    the voltage detection conductor is formed so as to include a plurality of detection lines each corresponding to positions of the plurality of conductive members; and
    a distance between the plurality of detection lines is set to be 2 to 2.5 times an insulation creepage distance that is defined according to a voltage of the electric storage module.

5. An electric storage module according to claim 1, wherein the guide members include a first region thereof the extends at an oblique angle to the middle portion.

* * * * *